United States Patent
Kirisawa et al.

(10) Patent No.: US 7,801,437 B2
(45) Date of Patent: Sep. 21, 2010

(54) IMAGING DEVICE, IMAGING DEVICE CONTROLLING METHOD, AND COMPUTER PROGRAM

(75) Inventors: Tsukasa Kirisawa, Kanagawa (JP); Takahiro Toujou, Saitama (JP)

(73) Assignee: Sony Corporation, Tokyo (JP)

( * ) Notice: Subject to any disclaimer, the term of this patent is extended or adjusted under 35 U.S.C. 154(b) by 259 days.

(21) Appl. No.: 11/861,801

(22) Filed: Sep. 26, 2007

(65) Prior Publication Data

US 2008/0101785 A1    May 1, 2008

(30) Foreign Application Priority Data

Oct. 25, 2006 (JP) ............................. 2006-290476

(51) Int. Cl.
 *G03B 15/03* (2006.01)
(52) U.S. Cl. ...................................... 396/158; 396/166
(58) Field of Classification Search .................. 396/158, 396/165–166
 See application file for complete search history.

(56) References Cited

U.S. PATENT DOCUMENTS 6,343,191 B1 * 1/2002 Watanabe ................... 396/277

2003/0071908 A1 * 4/2003 Sannoh et al. .............. 348/345
2006/0034602 A1 * 2/2006 Fukui ......................... 396/263

FOREIGN PATENT DOCUMENTS

| JP | 2003-107567 | 4/2003 |
| JP | 2004-133637 | 4/2004 |
| JP | 2004-234009 | 8/2004 |

\* cited by examiner

*Primary Examiner*—Melissa J Koval
*Assistant Examiner*—Leon W Rhodes
(74) *Attorney, Agent, or Firm*—Oblon, Spivak, McClelland, Maier & Neustadt, L.L.P.

(57) ABSTRACT

An imaging device that controls strobe emission for red-eye prevention includes a face detector configured to detect whether a face region is included in an image captured by the imaging device; a luminance detector configured to detect a luminance representing a brightness of an imaging environment; and a red-eye preventing emission controller configured to control strobe emission for red-eye prevention on the basis of face detection information detected by the face detector and luminance information detected by the luminance detector.

13 Claims, 5 Drawing Sheets

IMAGING DEVICE, IMAGING DEVICE CONTROLLING METHOD, AND COMPUTER PROGRAM

CROSS REFERENCES TO RELATED APPLICATIONS

The present invention contains subject matter related to Japanese Patent Application JP 2006-290476 filed in the Japanese Patent Office on Oct. 25, 2006, the entire contents of which are incorporated herein by reference.

BACKGROUND OF THE INVENTION

1. Field of the Invention

The present invention relates to imaging devices, imaging device controlling methods, and computer programs. More specifically, the present invention relates to an imaging device, an imaging device controlling method, and a computer program with which control is exercised to prevent red eyes that occur due to strobe emission.

2. Description of the Related Art

When a picture of a person is taken with strobe emission using an imaging device (e.g., a camera), in some cases, the eyes of the person look red in the picture, i.e., red eyes occur. This is because human pupils are opened widely under a relatively dark environment, and when strobe light (flash) is emitted in this state, the strobe light is reflected by the red color of the capillaries of the retinas, so that the eyes are captured as looking red.

Various techniques for preventing red eyes have been proposed. For example, according to a scheme disclosed in Japanese Unexamined Patent Application Publication No. 2003-107565, an image acquired by an imaging device is analyzed to check whether a human face is included in the image, and when a face is detected, red-eye preventing emission, i.e., pre-emission before strobe emission, is executed. However, according to this scheme, red-eye preventing emission is executed whenever a human face is detected. Thus, red-eye preventing emission is executed even when taking a picture of a person under a bright environment, in which red eyes are not likely to occur. This causes useless emission.

According to a scheme disclosed in Japanese Unexamined Patent Application Publication No. 2004-234009, a luminance in an imaging environment is measured, and when the luminance is less than a predetermined threshold, red-eye preventing emission, i.e., pre-emission before strobe emission, is executed. However, according to this scheme, red-eye preventing emission is executed whenever the luminance is low. Thus, pre-emission is executed even when no person is included in a captured image. This cases useless emission.

SUMMARY OF THE INVENTION

There exists a demand for an imaging device, an imaging device controlling method, and a computer program with which red-eye prevention can be achieved efficiently by checking a luminance in an imaging environment and whether a person is included in a captured image and by controlling emission on the basis of the results of checking.

According to an embodiment of the present invention, there is provided an imaging device that controls strobe emission for red-eye prevention. The imaging device includes a face detector configured to detect whether a face region is included in an image captured by the imaging device; a luminance detector configured to detect a luminance representing a brightness of an imaging environment; and a red-eye preventing emission controller configured to control strobe emission for red-eye prevention on the basis of face detection information detected by the face detector and luminance information detected by the luminance detector.

In the imaging device, for example, the red-eye preventing emission controller checks whether a condition that a face region is detected in the captured image by the face detector is satisfied and whether a condition that a luminance detected by the luminance detector is less than or equal to a predetermined threshold is satisfied, and exercises control so that red-eye preventing emission is executed on condition that these two conditions are satisfied.

Alternatively, in the imaging device, for example, when user setting of ordinary strobe emission for emitting a strobe light to an object at a timing of imaging is a forcible ON mode for forcibly executing strobe emission or an automatic mode for executing strobe emission on the basis of brightness, the red-eye preventing emission controller checks whether a condition that a face region is detected in the captured image by the face detector is satisfied and whether a condition that a luminance detected by the luminance detector is less than or equal to a predetermined threshold is satisfied, and exercises control so that red-eye preventing emission is executed on condition that these two conditions are satisfied.

Alternatively, in the imaging device, for example, the red-eye preventing emission controller allows user setting of three modes including a forcible ON mode for forcibly executing red-eye preventing emission, a forcible OFF mode for forcibly prohibiting red-eye preventing emission, and an automatic mode for conditionally executing red-eye preventing emission, and when the user setting is the automatic mode, the red-eye preventing emission controller checks whether a condition that a face region is detected in the captured image by the face detector is satisfied and whether a condition that a luminance detected by the luminance detector is less than or equal to a predetermined threshold is satisfied, and exercises control so that red-eye preventing emission is executed on condition that these two conditions are satisfied.

In the imaging device, the face detector may check whether a face region is included in the image captured by the imaging device by checking matching between the captured image and template image data stored in advance in a memory.

In the imaging device, the luminance detector may detect the luminance representing the brightness of the imaging environment according to the following equation:

$$EV = AV + TV + SV + BV$$

where EV denotes the luminance representing the brightness of the imaging environment, AV denotes an aperture value currently set to the imaging device, TV denotes a shutter speed, SV denotes an amount of automatic gain control representing a setting value for automatic gain control in an analog signal processor, and BV denotes an amount of incident light.

According to another embodiment of the present invention, there is provided an imaging device controlling method for controlling strobe emission for red-eye prevention in an imaging device. The imaging device controlling method includes the steps of detecting whether a face region is included in an image captured by the imaging device, the detecting being executed by a face detector; detecting a luminance representing a brightness of an imaging environment, the detecting being executed by a luminance detector; and controlling strobe emission for red-eye prevention on the basis of face detection information detected by the face detector and luminance information detected by the luminance detector, the controlling being executed by a red-eye preventing emission controller.

In the imaging device controlling method, in controlling strobe emission for red-eye prevention, for example, it is checked whether a condition that a face region is detected in the captured image by the face detector is satisfied and whether a condition that a luminance detected by the luminance detector is less than or equal to a predetermined threshold is satisfied, and control is exercised so that red-eye preventing emission is executed on condition that these two conditions are satisfied.

Alternatively, in the imaging device controlling method, in controlling strobe emission for red-eye prevention, for example, when user setting of ordinary strobe emission for emitting a strobe light to an object at a timing of imaging is a forcible ON mode for forcibly executing strobe emission or an automatic mode for executing strobe emission on the basis of brightness, it may be checked whether a condition that a face region is detected in the captured image by the face detector is satisfied and whether a condition that a luminance detected by the luminance detector is less than or equal to a predetermined threshold is satisfied, and control is exercised so that red-eye preventing emission is executed on condition that these two conditions are satisfied.

Alternatively, in the imaging device controlling method, for example, the red-eye preventing emission controller allows user setting of three modes including a forcible ON mode for forcibly executing red-eye preventing emission, a forcible OFF mode for forcibly prohibiting red-eye preventing emission, and an automatic mode for conditionally executing red-eye preventing emission, and, in controlling red-eye preventing emission, when the user setting is the automatic mode, it is checked whether a condition that a face region is detected in the captured image by the face detector is satisfied and whether a condition that a luminance detected by the luminance detector is less than or equal to a predetermined threshold is satisfied, and control is exercised so that red-eye preventing emission is executed on condition that these two conditions are satisfied.

In the imaging device controlling method, in detecting whether a face region is included in the image captured by the imaging device, matching between the captured image and template image data stored in advance in a memory may be checked.

In the imaging device controlling method, the luminance representing the brightness of the imaging environment may be detected according to the following equation:

$$EV=AV+TV+SV+BV$$

where EV denotes the luminance representing the brightness of the imaging environment, AV denotes an aperture value currently set to the imaging device, TV denotes a shutter speed, SV denotes an amount of automatic gain control representing a setting value for automatic gain control in an analog signal processor, and BV denotes an amount of incident light.

According to another embodiment of the present invention, there is provided a computer program for controlling strobe emission for red-eye prevention in an imaging device. The computer program includes the steps of causing a face detector to detect whether a face region is included in an image captured by the imaging device; causing a luminance detector to detect a luminance representing a brightness of an imaging environment; and causing a red-eye preventing emission controller to control strobe emission for red-eye prevention on the basis of face detection information detected by the face detector and luminance information detected by the luminance detector.

The computer program can be provided in a computer-readable form to a general-purpose computer system capable of executing various program codes, using a storage medium or communication medium, for example, a storage medium such as a compact disc, a flexible disc, or a magneto-optical disc, or a communication medium such as a network. By providing the program in a computer-readable form, processing is executed according to the program on the computer system.

Further objects, features, and advantages of the present invention will be understood from the following description of embodiments with reference to the accompanying drawings. In this specification, a system refers to a logical combination of a plurality of apparatuses, regardless of whether the constituent apparatuses are provided within the same case.

According to these embodiments of the present invention, in controlling red-eye preventing emission for preventing red eyes that occurs due to strobe emission by an imaging device, it is checked whether a face region is included in a captured image by the face detector and it is checked whether a luminance detected by the luminance detector is less than or equal to a predetermined threshold, and red-eye preventing emission is executed on condition that these two conditions are satisfied. Thus, useless emission is prevented when no face is included in the captured image, and useless emission is also prevented when the luminance is greater than the threshold. Accordingly, optimal emission control an reduction in power consumption can be achieved.

DESCRIPTION OF THE PREFERRED EMBODIMENTS

Figure 1:
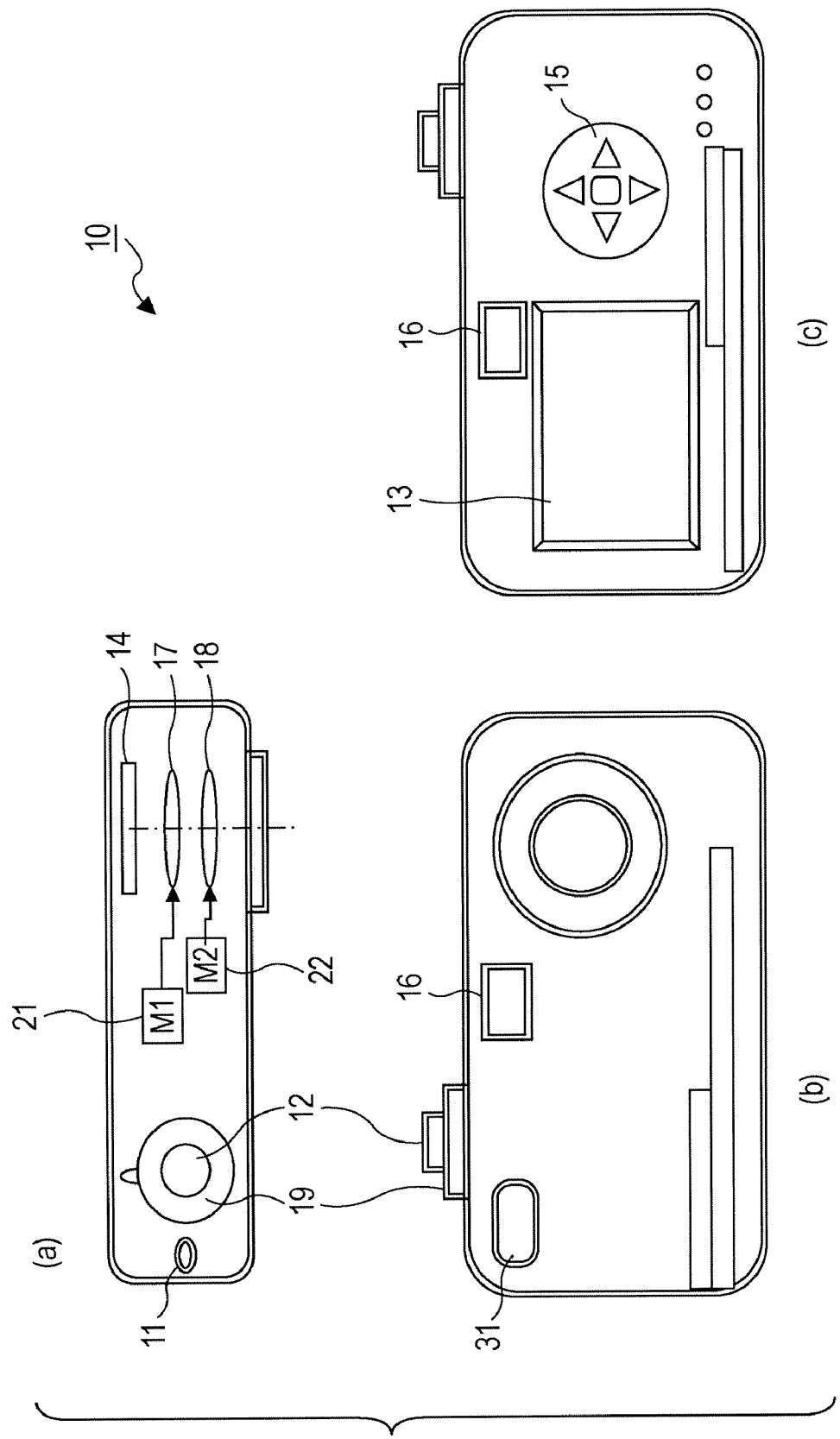
FIG. 1 is an illustration showing an example of the external appearance of an imaging device according to an embodiment of the present invention.

Now, imaging devices, methods of controlling imaging devices, and computer programs according to embodiments of the present invention will be described in detail with reference to the drawings. FIG. 1 is a diagram showing the external appearance of an imaging device 10 according to an embodiment of the present invention. In FIG. 1, part (a) shows a top view, part (b) shows a front view, and part (c) shows a rear view. In the top view shown in part (a), a lens portion is shown in section.

The imaging device 10 includes a power switch 11, a release switch 12 that functions as a trigger for setting a timing of capturing an image, i.e., a shutter, a monitor 13 that displays an image acquired by the imaging device 10 (through image), operation information, or the like, an imager 14 that functions as an imaging element (e.g., a charge coupled device (CCD)), an operation button 15 that allows input of various types of operation information, a view finder 16 for checking an image acquired by the imaging device 10 (through image), a focus lens 17 that is driven for focus adjustment, a zoom lens 18 that is driven for zoom adjustment, a mode dial 19 for setting an imaging mode, a focus lens motor (M1) 21 for driving the focus lens 21, a zoom lens motor (M2) 22 for driving the zoom lens 18, and a strobe emitter 31.

An image of an object is displayed on the view finder 16 and the monitor 13. Each of the view finder 16 and the monitor 13 is implemented, for example, by a liquid crystal display (LCD), and an image of an object acquired via a lens is displayed as a moving picture. This moving picture is referred to as a through image. A user checks a target object of imaging by checking the view finder 16 or 13, and presses the release switch 12 that functions as a shutter, whereby recording of an image is executed.

The emission of light by the strobe emitter 31 is controlled by a system controller included in the imaging device 10. In the imaging device 10 according to this embodiment, detection of luminance levels and detection of an object are executed on the basis of an image acquired by the imaging device 10 (through image), and emission of light by the strobe emitter 31 is controlled on the basis of the resulting detection information. The strobe emitter 31 can emit light in the following two modes.

(a) Ordinary strobe emission: Light is emitted toward an object at the timing of imaging.
(b) Red-eye preventing emission: Light is emitted immediately before the timing of imaging in order to prevent red eyes.

Light emission by the strobe emitter 31 in these modes is controlled by the system controller included in the imaging device 10.

Figure 2:
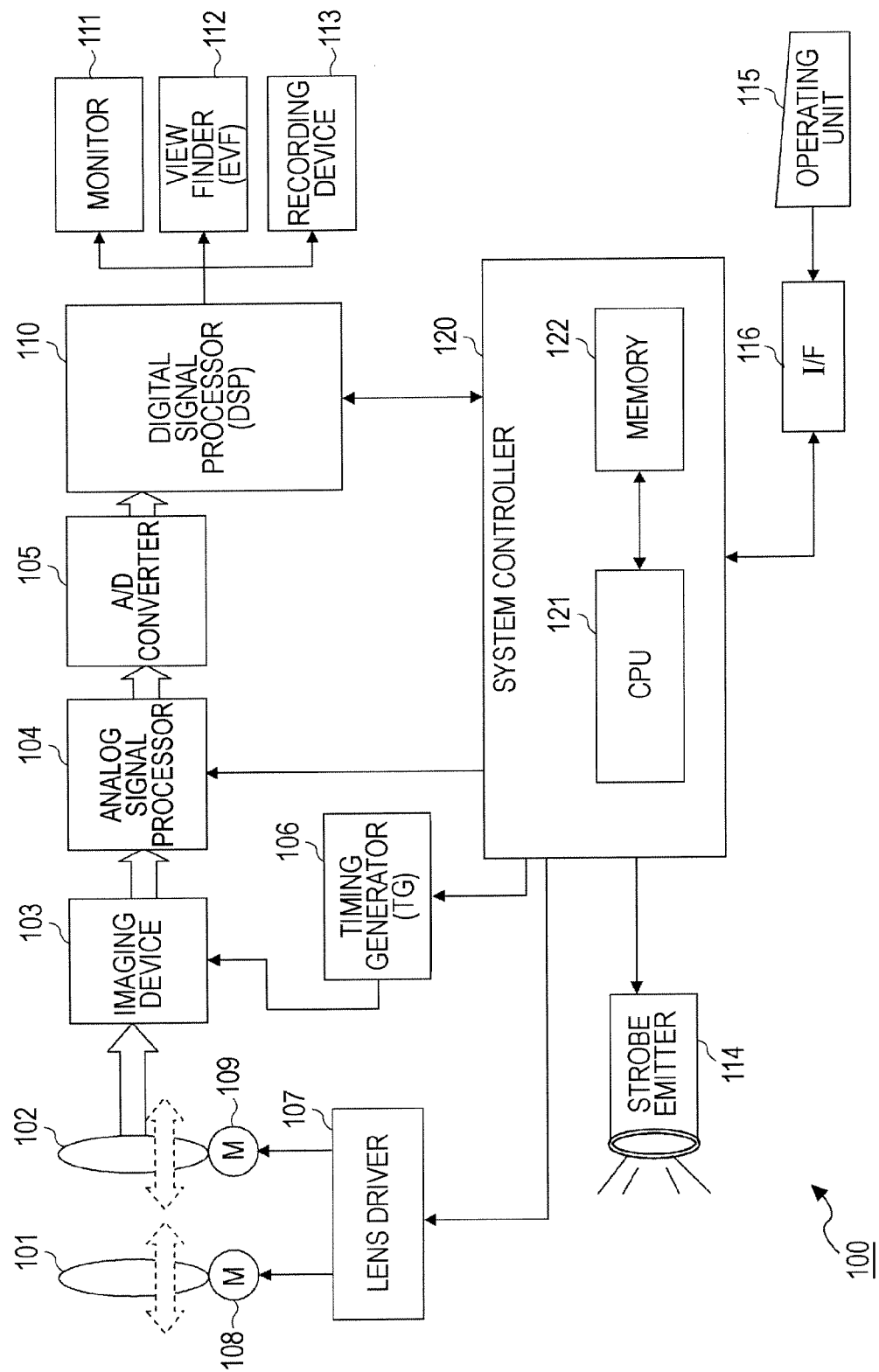
FIG. 2 is a diagram showing an example of the hardware configuration of the imaging device according to the embodiment of the present invention.

Now, the internal configuration of an imaging device 100 according to an embodiment of the present invention will be described. Referring to FIG. 2, incident light is input to an imaging element 103, such as a charge coupled device (CCD), through a focus lens 101 and a zoom lens 102, and undergoes photoelectric conversion in the imaging element 103. The data obtained through the photoelectric conversion is input to an analog signal processor 104, where analog signal processing, such as noise reduction, or gain control by an automatic gain controller (AGC), is executed, and the resulting signals are converted into digital signals in an A/D converter 105.

The digital data obtained by the A/D converter 105 is input to a digital signal processor (DSP) implemented by an LSI including a central processing unit (CPU), a memory, and so forth. In the DSP 110, digital signal processing is executed on the digital image data, such as tone adjustment, gamma correction, or the like for generating an image for output or recording. An image obtained through the processing in the DSP 110 (e.g., Y, Cb, and Cr signals) are supplied to a monitor 111 or an electronic view finder (EVF) 112 so that a corresponding image is displayed thereon.

Regardless of whether imaging is executed, images acquired through lenses are displayed continuously as a moving picture (through image). Upon execution of imaging in response to a shutter operation by the user, captured image data is recorded on a recording device 113, such as a flash memory.

In the imaging device 100 according to this embodiment, face detection is executed to detect whether a human face is included in a captured image, by analyzing the images acquired through lenses (through images) in the DSP 110 or a system controller 120. The face detection will be described later in detail.

An operating unit 115 includes a release switch 12 that is provided on the main unit of the imaging device 100 and that functions as a shutter, described with reference to FIG. 1, operation buttons 15 for inputting various types of operation information, a mode dial 19 for setting an imaging mode, and various other elements for inputting various types of setting information, such as setting of strobe emission. The operation information input by the user via the operating unit 115 is input to the system controller 120 via an interface (I/F) 116. At the time of input of various types of setting information by the user via the operating unit 115, for example, operation information (guidance) is displayed on the monitor 111 showing through images. The monitor 111 may be implemented as a touch panel that is also used as an operating unit (input unit).

In the imaging device 100 according to this embodiment, the user is allowed to define setting of light emission by a strobe emitter 114 via the operating unit 115. More specifically, the user can define setting of each of the following two types of light emission.

(a) Ordinary strobe emission: Light is emitted toward an object at the timing of imaging
(b) Red-eye preventing emission: Light is emitted immediately before the timing of imaging More specifically, the user can define the following setting regarding the ordinary strobe emission and the red-eye preventing emission.

(a) Ordinary strobe emission: "Automatic", "Forcible ON", and "Forcible OFF"
(b) Red-eye preventing emission: "Automatic", "Forcible ON", and "Forcible OFF"!

That is, three modes of "Automatic", "Forcible ON", and "Forcible OFF" can be selected for each of the ordinary strobe emission and the red-eye preventing emission The setting of "Forcible ON" and "Forcible OFF" for the strobe emission and the red-eye preventing emission is defined as follows:

"Forcible ON": Light emission is executed in any case at the time of imaging.
"Forcible OFF": Light emission is refrained in any case at the time of imaging.

The setting of "Automatic" defines different operations for the strobe emission and the red-eye preventing emission, as follows.

In "Automatic" mode of the strobe emission, control is exercised so that whether to emit light is determined on the basis of a luminance in the imaging environment.

In "Automatic" mode of the red-eye preventing emission, control is exercised on the basis of a result of determining whether strobe light is emitted, whether a human face is included in an acquired image (through image), and a luminance in the imaging environment.

Processing executed in these modes will be described later.

The system controller 120 is, for example, a microcomputer, and includes, for example, a CPU 121, a memory 122, and so forth. The system controller 120 controls processing executed by the imaging device 100 according to a program stored in advance in the memory 122. The memory 122 stores processing execution programs, image data, various types of auxiliary information (e.g., threshold information described later), and so forth.

A lens driver 107 drives a focus-lens driving motor 108 provided in association with the focus lens 101 and a zoom-lens motor 109 provided in association with the zoom lens 102. A timing generator 106 controls timing of processing executed by the imaging element 103 by generating timing control signals.

Figure 3:
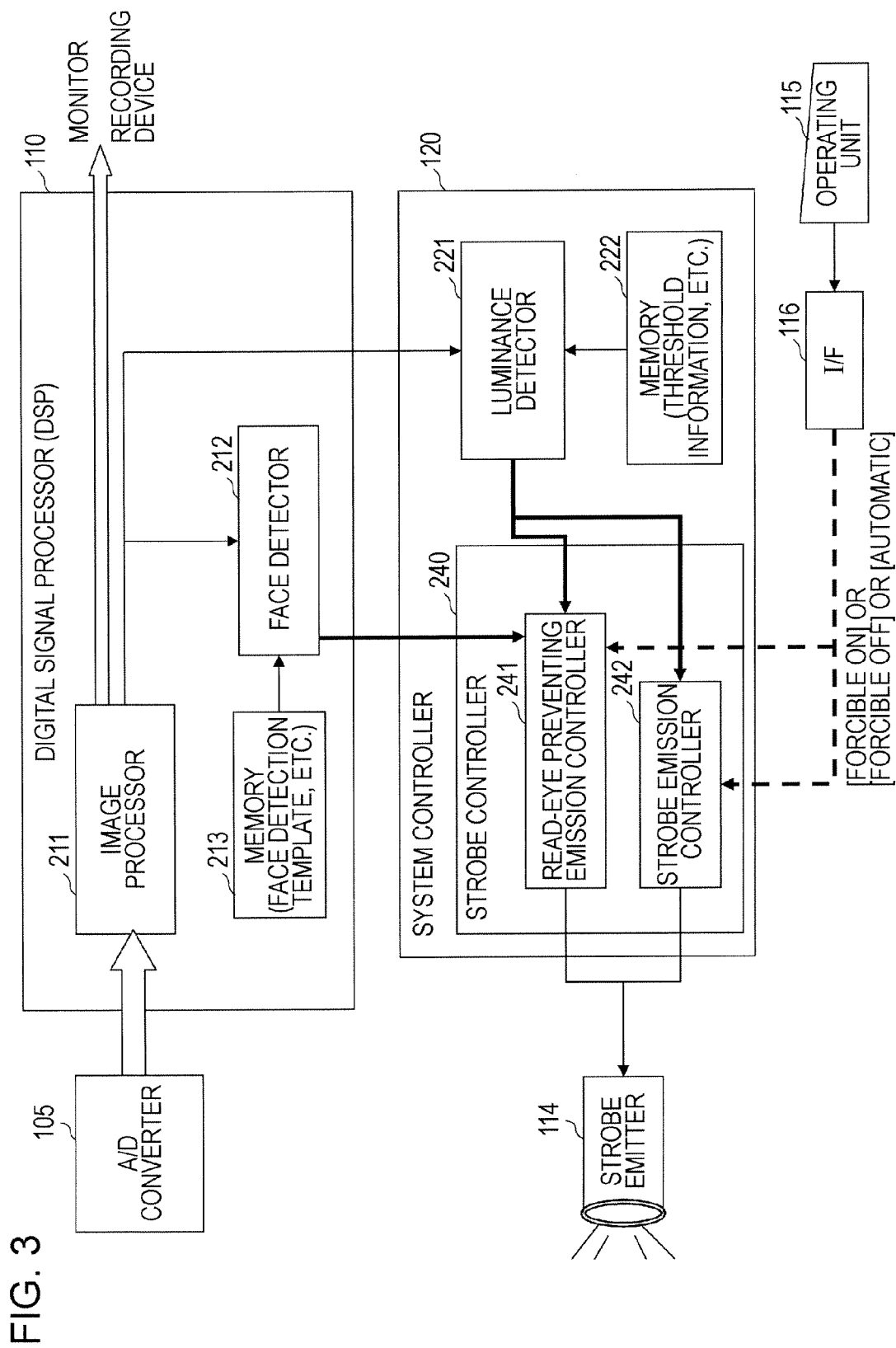
FIG. 3 is a diagram showing an example of strobe emission control executed by the imaging device according to the embodiment of the present invention and an example of the functional configuration thereof.

Next, the configuration and operation for controlling light emission by a strobe light emitter 114 in the imaging device 100 will be described with reference to FIG. 3 and the subsequent figures. FIG. 3 is a diagram for explaining functions for controlling light emission by the strobe light emitter 114, executed by the DSP 110 and the system controller 120 in the imaging device 100 shown in FIG. 2. The DSP 110 and the system controller 120 executes various types of processing by executing programs stored in a memory by a data processing unit including a CPU or the like. FIG. 3 is a functional block diagram for explaining the processing functions.

The DSP 110 receives input of digital data from the A/D converter 105. In the DSP 110, an image processor 211 generates an image for monitor output and recording. Furthermore, in the DSP 110, a face detector 212 determines whether a face region is detected in an image acquired by the imaging device 100.

Now, detection of a face region, executed by the face detector 212, will be described. Various techniques of face recognition and tracking have been proposed, so that existing techniques can be used as appropriate. For example, face detection is executed on the basis of matching between an acquired image with a template representing a record of information of distribution of luminance levels in faces, as described in Japanese Unexamined Patent Application Publication No. 2004-133637.

A memory 213 stores a plurality of pieces of template information representing information of luminance distribution of faces. The template information includes a plurality of pieces of data for various face angles. The face detector 212 receives a captured image from the image processor 211, and sequentially checks matching with templates obtained from the memory 213. When a certain region matches a template as a result of executing matching sequentially while shifting the captured image two-dimensionally, the face detector 212 determines that a face is included in the region. The face detector 212 determines whether a face region is included in the image captured by the imaging device 100, for example, by the method described above, and outputs information representing the result to a strobe controller 240 of the system controller 120.

The system controller 120 includes a luminance detector 221 that measures the luminance of an imaging environment (EV). For example, the luminance detector 221 calculates the brightness of an imaging environment (EV) on the basis of an aperture value (AV) currently set in the imaging device 100, a shutter speed (TV), an AGC amount representing a setting value of gain for AGC of the analog signal processor (SV), and the amount of incident light (BV), according to the following equation:

$$EV=AV+TV+SV+BV$$

Furthermore, the luminance detector 221 compares a threshold set in advance in the memory 222 with the detected luminance (EV), and inputs the result of comparison to the strobe controller 240.

The strobe controller 240 is a controller that controls light emission by the strobe emitter 114. The strobe controller 240 includes a red-eye preventing emission controller 241 that controls light emission for red-eye prevention immediately before the timing of imaging, and a strobe emission controller 242 that controls light emission for irradiating an object at the timing of imaging.

Each of the red-eye preventing emission controller 241 and the strobe emission controller 242 receives input of setting information from the operating unit 115, i.e., user setting information indicating "Automatic", "Forcible ON", or "Forcible OFF" as described earlier, and controls light emission according to the setting.

Furthermore, each of the red-eye preventing emission controller 241 and the strobe emission controller 242 receives input of information representing the brightness of the imaging environment (luminance), or information representing the result of comparison between the luminance and the threshold, from the luminance detector 221, and controls light emission on the basis of the user setting described above and the luminance information.

Furthermore, the red-eye preventing emission controller 241 receives input of information representing the result of detection by the face detector 212, i.e., information indicating whether a face region is included in the image acquired by the imaging device 100, and controls light emission on the basis of the user setting, the luminance information, and the face detection information.

In the example configuration shown in FIG. 3, face detection is executed in the DSP 110. Alternatively, a face detector may be provided in the system controller 120 so that face detection is executed in the system controller 120.

Figure 4:
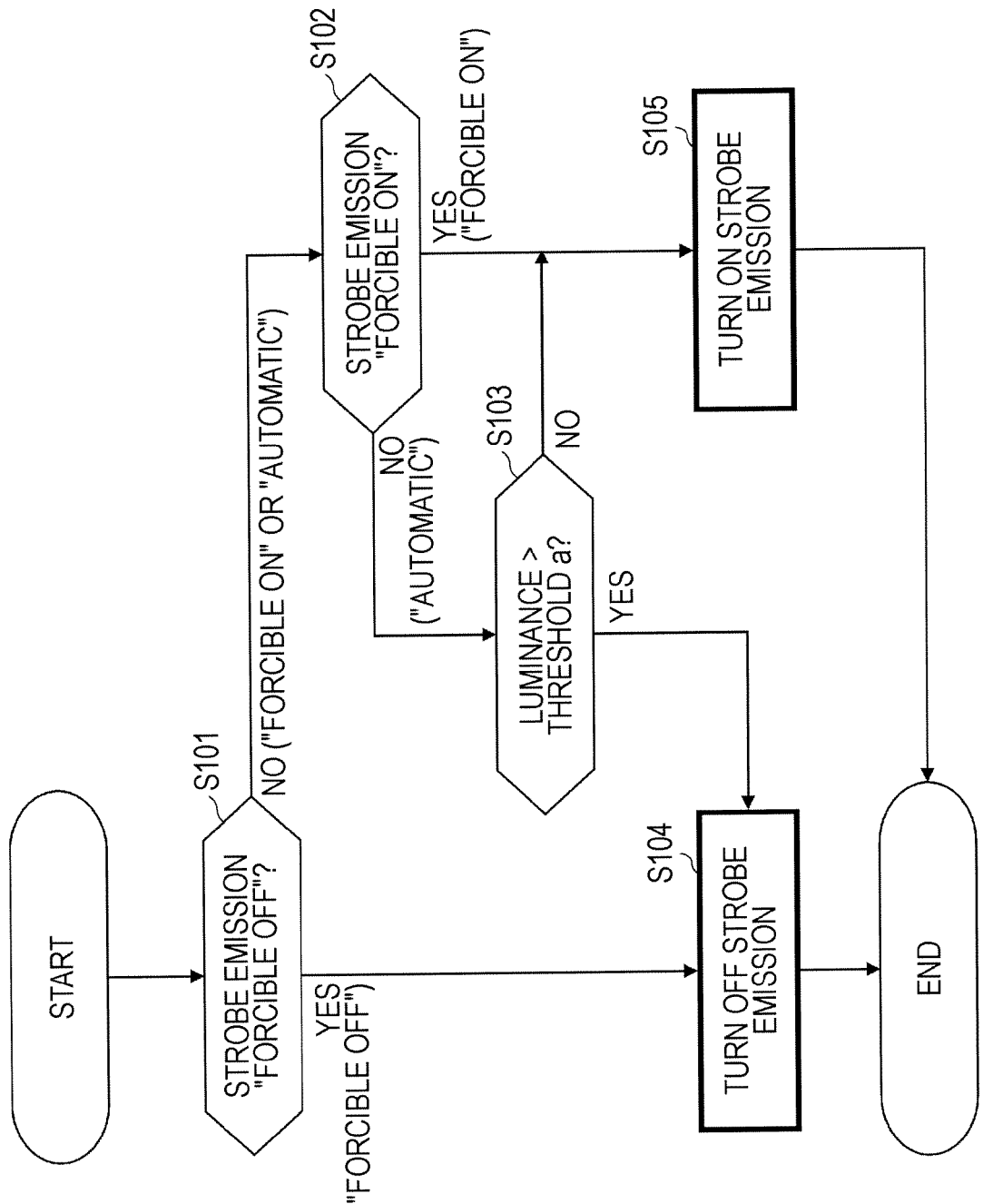
FIG. 4 is a flowchart of a strobe emission controlling sequence executed by the imaging device according to the embodiment of the present invention.

Now, specific strobe emission controlling sequences executed by the red-eye preventing emission controller 241 and the strobe emission controller 242 will be described with reference to flowcharts shown in FIGS. 4 and 5. First, a strobe emission controlling sequence executed by the strobe emission controller 242, i.e., a control sequence for ordinary strobe emission for irradiating an object at the timing of imaging, will be described with reference to FIG. 4.

First, in step S101, it is checked whether the user setting for strobe emission is "Forcible OFF" or other settings ("Forcible ON" or "Automatic"). When the user setting is "Forcible OFF", the sequence proceeds to step S104, in which control is exercised so that ordinary strobe emission is turned off. That is, strobe emission is refrained in any case regardless of the luminance of the imaging environment.

When it is determined in step S101 that the user setting for strobe emission is not "Forcible OFF", i.e., when the user setting for strobe emission is "Forcible ON" or "Automatic", the controlling sequence proceeds to step S102. In step S102, it is checked whether the user setting of strobe emission is "Forcible ON" or "Automatic". When the user setting of strobe emission is "Forcible ON", the controlling sequence proceeds to step S105, in which control is exercised so that ordinary strobe emission is turned on. That is, strobe emission is executed in any case regardless of the luminance of the imaging environment.

When it is determined in step S102 that the user setting of strobe emission is "Automatic", the controlling sequence proceeds to step S103. In step S103, the luminance of the imaging environment is checked on the basis of information input from the luminance detector shown in FIG. 3. That is, it is checked whether the luminance of the imaging environment (EV) and a predetermined threshold a satisfy the relationship EV>a.

That is, it is checked whether the luminance of the imaging environment is brighter than the predetermined luminance threshold a. The threshold a is chosen to be a value representing a threshold between a case where ordinary strobe emission is executed and a case where ordinary strobe emission is refrained under "Automatic" mode.

When EV>a is satisfied, so that it is determined that the luminance of the imaging environment (EV) is brighter than the predetermined luminance threshold a, the controlling sequence proceeds to step S104, in which control is exercised so that strobe emission is turned off. On the other hand, when EV>a is not satisfied, so that it is determined that the luminance of the imaging environment (EV) is not brighter than the predetermined luminance threshold a, the controlling sequence proceeds to step S105, in which control is exercised so that strobe emission is turned on.

Next, a red-eye preventing emission controlling sequence executed by the red-eye preventing emission controller 241 shown in FIG. 3, i.e., a sequence for controlling strobe emission for preventing red eye by irradiating an object immediately before the timing of imaging, will be described with reference to a flowchart shown in FIG. 5.

First, in step S201, it is checked whether the user setting of strobe emission is "Forcible OFF" or other setting ("Forcible ON" or "Automatic"). This checking relates to the user setting of ordinary strobe emission for irradiating an object at the timing of imaging. Basically, red-eye does not occur when strobe emission is not executed. Thus, first, in step S201, it is checked whether the user setting of strobe emission is "Forcible OFF". When the user setting of strobe emission is "Forcible OFF", the controlling sequence proceeds to step S206, in which control is exercised so that red-eye preventing emission is turned off. That is, the setting is made so that red-eye preventing emission is refrained in any case. In the sequence from step S201 to step S206, the setting of strobe emission is "Forcible OFF". Thus, red-eye, which occurs dues to strobe emission, does not occur, so that red-eye preventing emission is not executed.

When it is determined in step S201 that the user setting of strobe emission is not "Forcible OFF", i.e., when the user setting of strobe emission is "Forcible ON" or "Automatic", the controlling sequence proceeds to step S202. In step S202, it is checked whether the user setting of red-eye preventing emission is "Forcible OFF" or other setting ("Forcible ON" or "Automatic").

When the user setting of red-eye preventing emission is "Forcible OFF", the controlling sequence proceeds to step S206, in which control is exercised so that red-eye preventing emission is turned off. That is, red-eye preventing emission is refrained in any case. The sequence through steps S201 to Step S206 is executed when the setting of strobe emission is "Forcible ON" or "Automatic" and the setting of red-eye preventing emission is "Forcible OFF", and control is exercised so that red-eye preventing emission is not executed.

In this case, ordinary strobe emission is executed in some cases, but red-eye preventing emission is not executed since red-eye preventing emission is forcibly turned off by the user.

When it is determined in step S202 that the setting of red-eye preventing emission is not "Forcible OFF", i.e., when the setting of red-eye preventing emission is "Forcible ON" or "Automatic", the controlling sequence proceeds to step S203. In step S203, it is checked whether the setting of red-eye preventing emission is "Forcible ON" or "Automatic".

When the setting is "Forcible ON", the controlling sequence proceeds to step S207, in which control is exercised so that red-eye preventing emission is turned on. That is, control is exercised so that red-eye preventing emission is executed in any case. The sequence through steps S201, S202, S203, and S207 is executed when the setting of strobe emission is "Forcible ON" or "Automatic" and the setting of red-eye preventing emission is "Forcible ON", and red-eye preventing emission is executed in any case.

In this case, ordinary strobe emission is executed in some cases and not executed in other cases, but red-eye preventing emission is executed in any case since red-eye preventing emission is forcibly turned on.

When it is determined in step S203 that the setting of red-eye preventing emission is "Automatic" mode, the controlling sequence proceeds to step S204, in which it is checked whether a face is included in the captured image. This checking is executed on the basis of information input from the face detector 213 shown in FIG. 3.

When it is determined in step S204 that no face is included in the captured image, the controlling sequence proceeds to step S206, in which control is exercised so that red-eye preventing emission is turned off. That is, red-eye preventing emission is not executed. The sequence through steps S201, S202, S203, S204, and S206 is executed when the following three conditions are satisfied, and control is exercised so that red-eye preventing emission is not executed.

(1) Setting of strobe emission is "Forcible ON" or "Automatic".
(2) Setting of red-eye preventing emission is "Automatic".
(3) No face is detected in the captured image.

In this case, ordinary strobe emission is executed or not executed depending on circumstances, but red-eye preventing emission is turned off and is not executed. In this case, since no face is included in the captured image, it is determined that there is no need to prevent red eyes, and control is exercised so that red-eye preventing emission is not executed. This serves to prevent useless red-eye preventing emission.

On the other hand, when it is determined in step S204 that a face is detected is detected in the captured image, the controlling sequence proceeds to step S205, in which a luminance based on information input from the luminance detector 221 shown in FIG. 3 is checked. That is, it is checked whether the luminance EV representing the brightness of the imaging environment and the predetermined threshold b satisfies the relationship EV>b. That is, it is checked whether the luminance EV is brighter than the luminance threshold b.

When it is determined in step S205 that the relationship EV>b is satisfied so that the luminance EV representing the brightness of the imaging environment is brighter than the predetermined threshold b, the controlling sequence proceeds to step S206, in which control is exercised so that red-eye preventing emission is turned off. The sequence through steps S201, S202, S203, S204, S205, and S206 is executed when the following four conditions are satisfied, and red-eye preventing emission is not executed.

(1) Setting of strobe emission is "Forcible ON" or "Automatic".
(2) Setting of red-eye preventing emission is "Automatic".
(3) A face is detected in the captured image.
(4) The luminance EV representing the brightness of the imaging environment is brighter than the threshold b.

In this case, although strobe emission may be executed, since the luminance of the imaging environment is sufficiently bright (EV>b), so that even when a human face is included, the pupils of the eyes are not widely open. Thus, the possibility of occurrence of red eyes due to strobe emission is small.

According to this embodiment, useless red-eye preventing emission is refrained when these conditions are satisfied. For example, the value of the threshold b is chosen to be approximately seven times as large as an expected ordinary luminance. However, without limitation to this example, the value of the threshold b may be chosen on the basis of an approximate brightness of imaging environment with which strobe emission is likely to cause red eyes.

For example, the threshold b may be chosen to be equal to the threshold luminance a used to determine whether to execute strobe emission when the setting of ordinary strobe emission is "Automatic" as described earlier with reference to FIG. 4. Assuming that the threshold a is equal to the threshold b, when the setting of strobe emission is "Automatic", red-eye preventing emission is executed when strobe emission is executed, and red-eye preventing emission is not executed when strobe emission is not executed.

Alternatively, the threshold b may be chosen to be somewhat larger (brighter) than the threshold a. That is the threshold b is chosen so that b>a. In this case, when the setting of strobe emission is "Automatic" and the setting of red-eye preventing emission is "Automatic", in some cases, red-eye preventing emission is not executed even when strobe emission is executed. However, these are cases where it is determined that the luminance of the imaging environment is sufficiently bright (EV>b), so that even when a human face is included, the pupils of the eyes are not widely open and therefore the possibility of occurrence of red eyes due to strobe emission is small. When the setting is such that b>a, red-eye preventing emission is reduced, so that power consumption can be reduced.

On the other hand, when it is determined in step S205 that the relationship EV>b is not satisfied, i.e., when the luminance of the image acquired by the imaging device is less than or equal to the predetermined luminance threshold b, the controlling sequence proceeds to step S207, in which control is exercised so that red-eye preventing emission is turned on. The sequence through steps S201, S202, S203, S204, S205, and S207 is executed when the following four conditions are satisfied, and red-eye preventing emission is executed.

(1) Setting of strobe emission is "Forcible ON" or "Automatic".

(2) Setting of red-eye preventing emission is "Automatic".

(3) A face is detected in the captured image.

(4) The luminance EV representing the brightness of the imaging environment is not brighter than the threshold b.

In this case, since the setting of strobe emission is "Forcible ON" or "Automatic", ordinary strobe emission may be executed. Furthermore, since the luminance of the imaging environment is not sufficiently bright (EV$\leq$b), the pupils of the eyes in a human face included in the captured image tend to be widely open, so that the possibility of occurrence of red eyes due to strobe emission is high. Accordingly, red-eye preventing emission is executed.

Figure 5:
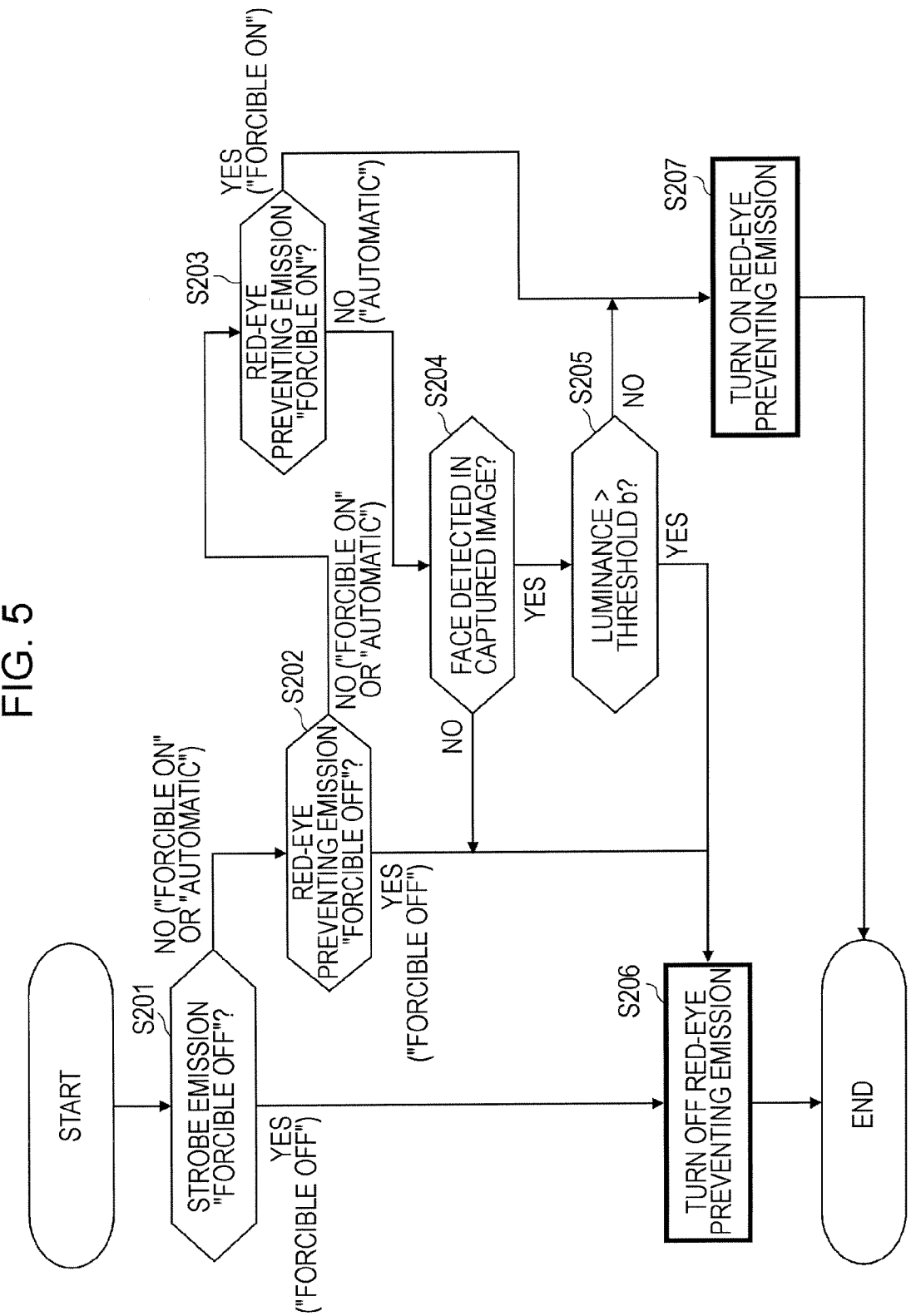
FIG. 5 is a flowchart of a red-eye preventing emission controlling sequence executed by the imaging device according to the embodiment of the present invention.

As described above, according to this embodiment, red-eye preventing emission is controlled according to the controlling sequence shown in FIG. 5. As described earlier, the value of the threshold b is chosen to be a level at which red eyes are likely to occur when strobe emission is executed. For example, the value of the threshold b is chosen to be approximately seven times as large as an expected ordinary luminance. Since whether red eyes occur depends on individuals, user setting of the value of the threshold b may be allowed. Furthermore, information representing the capacity of a battery may be input to the red-eye preventing emission controller 241 so that a relatively large (bright) value can be chosen as the threshold b to promote emission when the battery has a sufficient capacity while a relatively small (dark) value can be chosen as the threshold b to suppress emission when the battery does not have a sufficient capacity.

A feature of the embodiment consists in the control in the case where the user setting of red-eye preventing emission is "Automatic". The control in the case where the user setting of red-eye preventing emission is "Automatic" can be summarized as follows:

Case 1

(a) User setting of red-eye preventing emission is "Automatic".

(b) User setting of ordinary strobe emission is "Forcible OFF".

In this case, red-eye preventing emission is turned off, so that red-eye preventing emission is not executed.

Case 2

(a) User setting of red-eye preventing emission is "Automatic".

(b) User setting of ordinary strobe emission is "Forcible ON" or "Automatic".

In this case, control is exercised in one of the following three manners depending on results of face detection and luminance detection.

(2-1)

(c1) No face is detected in the captured image.

In this case, red-eye preventing emission is turned off, so that red-eye preventing emission is not executed.

(2-2)

(c2) A face is detected in the captured image.

(d1) The luminance EV of the captured image is greater (brighter) than the threshold b (EV>b).

In this case, red-eye preventing emission is turned off, so that red-eye preventing emission is not executed.

(2-3)

(c2) A face is detected in the captured image.

(d2) The luminance EV of the captured image is not greater (not brighter) than the threshold b (EV$\leq$b).

In this case, red-eye preventing emission is turned on, so that red-eye preventing emission is executed.

As described above, red-eye preventing emission is executed only in the case (2-3) when the user setting is defined as follows:

(a) User setting of red-eye preventing emission is "Automatic".

(b) User setting of ordinary strobe emission is "Forcible ON" or "Automatic".

That is, in the case of the above user setting, red-eye preventing emission is executed only when a face is detected in the captured image and the luminance EV of the captured image is not greater (not brighter) than the threshold b (EV$\leq$b).

When no face is detected in the captured image, or when the luminance EV of the captured image is greater (brighter) than the threshold b (EV>b), red-eye preventing emission is refrained. When no face is detected in the captured image, red-eye preventing emission is not executed since no object with which red eyes occur is not included. When the luminance EV of the captured image is greater (brighter) than the threshold b (EV>b), red-eye preventing emission is not executed since even when a face is included in the captured image, the pupils are not widely open so that the possibility of occurrence of red eyes is small. According to this embodiment, red-eye preventing emission is refrained in these cases. This serves to reduce useless emission, so that, for example, useless power consumption of a battery can be reduced.

The present invention has been described above in detail in the context of specific embodiments. However, it should be understood that various modifications of and alternatives of the embodiments can be conceived by those skilled in the art without departing from the spirit of the present invention. That is, the present invention has been disclosed by way of examples, and the present invention should not be construed restrictively. The scope of the present invention should be determined according to the appended claims.

The series of processes described in the specification can be executed by hardware, by software, or by combination of hardware and software. When the processes are executed by software, programs in which the processing sequences are recorded are installed and executed in a memory of a computer embedded in special hardware, or the programs are installed and executed on a general-purpose computer that is capable of executing various processes.

For example, the programs can be recorded in advance on a recording medium such as a hard disc or a read-only memory (ROM). Alternatively, the programs may be temporarily or permanently stored (recorded) on a removable recording medium such as a flexible disc, a compact disc read-only memory (CD-ROM), a magneto-optical (MO) disc, a digital versatile disc (DVD), a magnetic disc, or a semiconductor memory. Such a removable recording medium can be provided in the form of what is called package software.

Instead of installing the programs on a computer from the removable recording medium described above, the programs may be transferred by wireless to a computer from a downloading site or transferred by wire to a computer via a network such as a local area network (LAN) or the Internet, so that the computer can receive the programs transferred and install the programs on an internal recording medium such as a hard disc.

It is to be understood that the various processes described in this specification may be executed in parallel or individually instead of being executed sequentially in the orders described herein, in accordance with the processing ability of an apparatus that executes the processes or other factors as appropriate. In this specification, a system refers to a logical combination of plurality of apparatuses, regardless of whether the constituent apparatuses are provided within the same case.

What is claimed is:

1. An imaging device that controls strobe emission for red-eye prevention, the imaging device comprising:
    an image capturing unit configured to capture an image;
    a face detector configured to detect whether a face region is included in the image captured by the image capturing unit in response to a strobe emission being set to at least one of a forcible ON mode and a strobe automatic mode, and to a red-eye preventing emission being set to a red-eye automatic mode;
    a luminance detector configured to detect a luminance representing a brightness of an imaging environment; and
    a red-eye preventing emission controller configured to control strobe emission for red-eye prevention on the basis of face detection information detected by the face detector and luminance information detected by the luminance detector.

2. The imaging device according to claim 1,
    wherein the red-eye preventing emission controller checks whether a condition that a face region is detected in the captured image by the face detector is satisfied and whether a condition that a luminance detected by the luminance detector is less than or equal to a predetermined threshold is satisfied, and exercises control so that the red-eye preventing emission is executed on condition that these two conditions are satisfied.

3. The imaging device according to claim 1,
    wherein when user setting of the strobe emission for emitting a strobe light to an object at a timing of imaging is the forcible ON mode for forcibly executing strobe emission or the strobe automatic mode for executing strobe emission on the basis of brightness, the red-eye preventing emission controller checks whether a condition that a face region is detected in the captured image by the face detector is satisfied and whether a condition that a luminance detected by the luminance detector is less than or equal to a predetermined threshold is satisfied, and exercises control so that the red-eye preventing emission is executed on condition that these two conditions are satisfied.

4. The imaging device according to claim 1,
    wherein the red-eye preventing emission controller allows user setting of three modes including a forcible ON mode for forcibly executing red-eye preventing emission, a forcible OFF mode for forcibly prohibiting red-eye preventing emission, and the red-eye automatic mode for conditionally executing red-eye preventing emission, and
    wherein when the user setting is the red-eye automatic mode, the red-eye preventing emission controller checks whether a condition that a face region is detected in the captured image by the face detector is satisfied and whether a condition that a luminance detected by the luminance detector is less than or equal to a predetermined threshold is satisfied, and exercises control so that the red-eye preventing emission is executed on condition that these two conditions are satisfied.

5. The imaging device according to claim 1,
    wherein the face detector checks whether a face region is included in the image captured by the image capturing unit by checking matching between the captured image and template image data stored in advance in a memory.

6. The imaging device according to claim 1,
    wherein the luminance detector detects the luminance representing the brightness of the imaging environment according to the following equation:

$$EV=AV+TV+SV+BV$$

where EV denotes the luminance representing the brightness of the imaging environment, AV denotes an aperture value currently set to the imaging device, TV denotes a shutter speed, SV denotes an amount of automatic gain control representing a setting value for automatic gain control in an analog signal processor, and BV denotes an amount of incident light.

7. A method for controlling strobe emission for red-eye prevention in an imaging device, the method comprising:
    capturing an image by an image capturing unit;
    detecting whether a face region is included in the image captured by the image capturing unit, the detecting being executed by a face detector in response to a strobe emission being set to at least one of a forcible ON mode and a strobe automatic mode, and to a red-eye preventing emission being set to a red-eye automatic mode;
    detecting a luminance representing a brightness of an imaging environment, the detecting being executed by a luminance detector; and
    controlling strobe emission for red-eye prevention on the basis of face detection information detected by the face detector and luminance information detected by the luminance detector, the controlling being executed by a red-eye preventing emission controller.

8. The method according to claim 7,
wherein, in controlling the strobe emission for red-eye prevention, it is checked whether a condition that a face region is detected in the captured image by the face detector is satisfied and whether a condition that a luminance detected by the luminance detector is less than or equal to a predetermined threshold is satisfied, and control is exercised so that the red-eye preventing emission is executed on condition that these two conditions are satisfied.

9. The method according to claim 7,
wherein, in controlling the strobe emission for red-eye prevention, when user setting of the strobe emission for emitting a strobe light to an object at a timing of imaging is the forcible ON mode for forcibly executing strobe emission or the strobe automatic mode for executing strobe emission on the basis of brightness, it is checked whether a condition that a face region is detected in the captured image by the face detector is satisfied and whether a condition that a luminance detected by the luminance detector is less than or equal to a predetermined threshold is satisfied, and control is exercised so that the red-eye preventing emission is executed on condition that these two conditions are satisfied.

10. The method according to claim 7,
wherein the red-eye preventing emission controller allows user setting of three modes including a forcible ON mode for forcibly executing red-eye preventing emission, a forcible OFF mode for forcibly prohibiting red-eye preventing emission, and the red-eye automatic mode for conditionally executing red-eye preventing emission, and
wherein, in controlling the red-eye preventing emission, when the user setting is the red-eye automatic mode, it is checked whether a condition that a face region is detected in the captured image by the face detector is satisfied and whether a condition that a luminance detected by the luminance detector is less than or equal to a predetermined threshold is satisfied, and control is exercised so that the red-eye preventing emission is executed on condition that these two conditions are satisfied.

11. The method according to claim 7,
wherein, in detecting whether a face region is included in the image captured by the image capturing unit, matching between the captured image and template image data stored in advance in a memory is checked.

12. The method according to claim 7,
wherein the luminance representing the brightness of the imaging environment is detected according to the following equation:

$$EV=AV+TV+SV+BV$$

where EV denotes the luminance representing the brightness of the imaging environment, AV denotes an aperture value currently set to the imaging device, TV denotes a shutter speed, SV denotes an amount of automatic gain control representing a setting value for automatic gain control in an analog signal processor, and BV denotes an amount of incident light.

13. A non-transitory computer readable storage medium including stored thereon computer executable instructions, wherein the instructions, when executed by a computer, cause the computer to perform a method for controlling strobe emission for red-eye prevention in an imaging device, the method comprising:

capturing an image by an image capturing unit;

causing a face detector to detect whether a face region is included in the image captured by the image capturing unit in response to a strobe emission being set to at least one of a forcible ON mode and a strobe automatic mode, and to a red-eye preventing emission being set to a red-eye automatic mode;

causing a luminance detector to detect a luminance representing a brightness of an imaging environment; and causing a red-eye preventing emission controller to control strobe emission for red-eye prevention on the basis of face detection information detected by the face detector and luminance information detected by the luminance detector.

* * * * *